March 14, 1933. W. SALISBURY 1,901,195
TILE MANUFACTURE
Filed Jan. 14, 1931   3 Sheets-Sheet 1

Inventor
William Salisbury
By
*Geo E Kirk*
Attorney

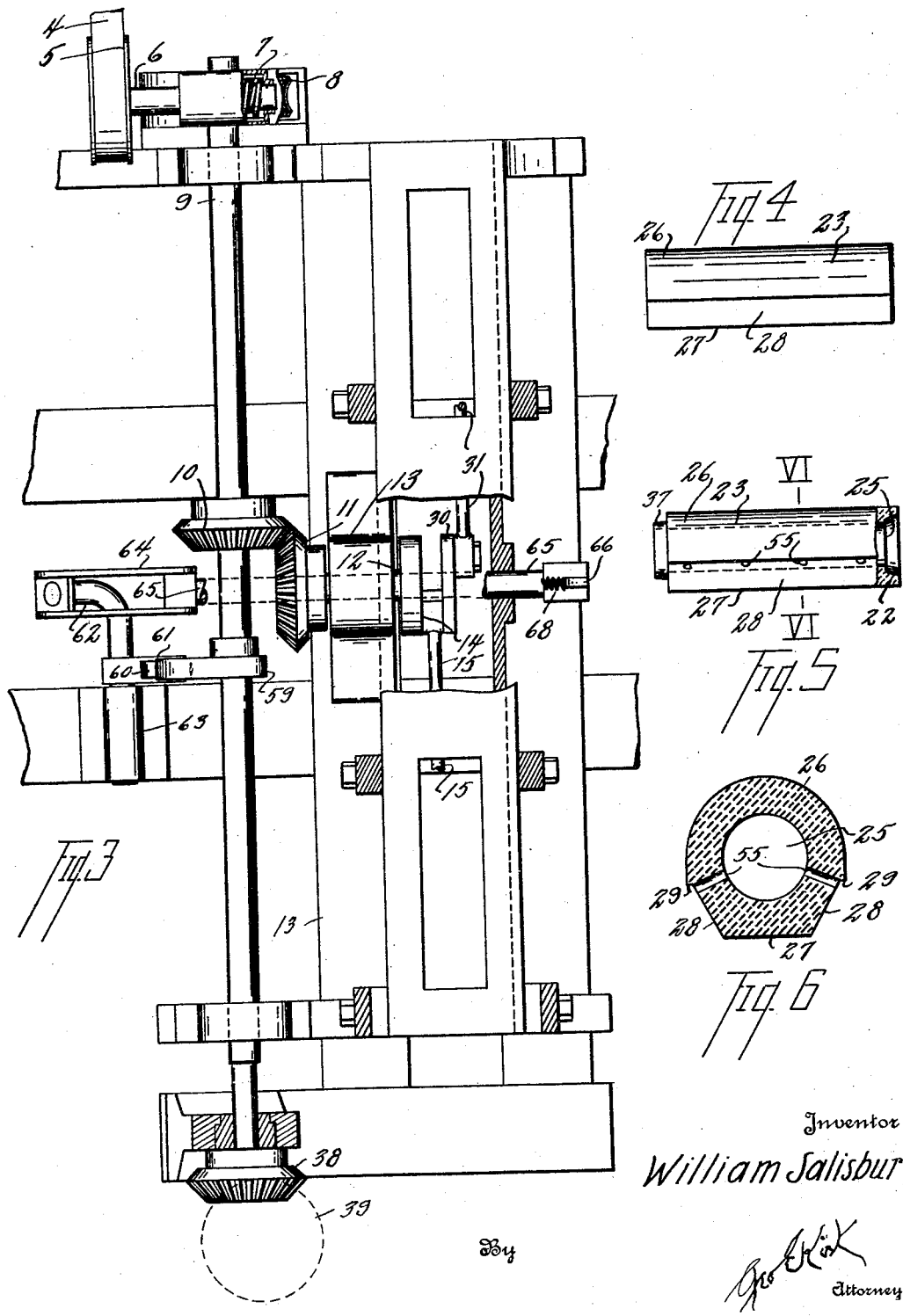

March 14, 1933.  W. SALISBURY  1,901,195
TILE MANUFACTURE
Filed Jan. 14, 1931   3 Sheets-Sheet 3
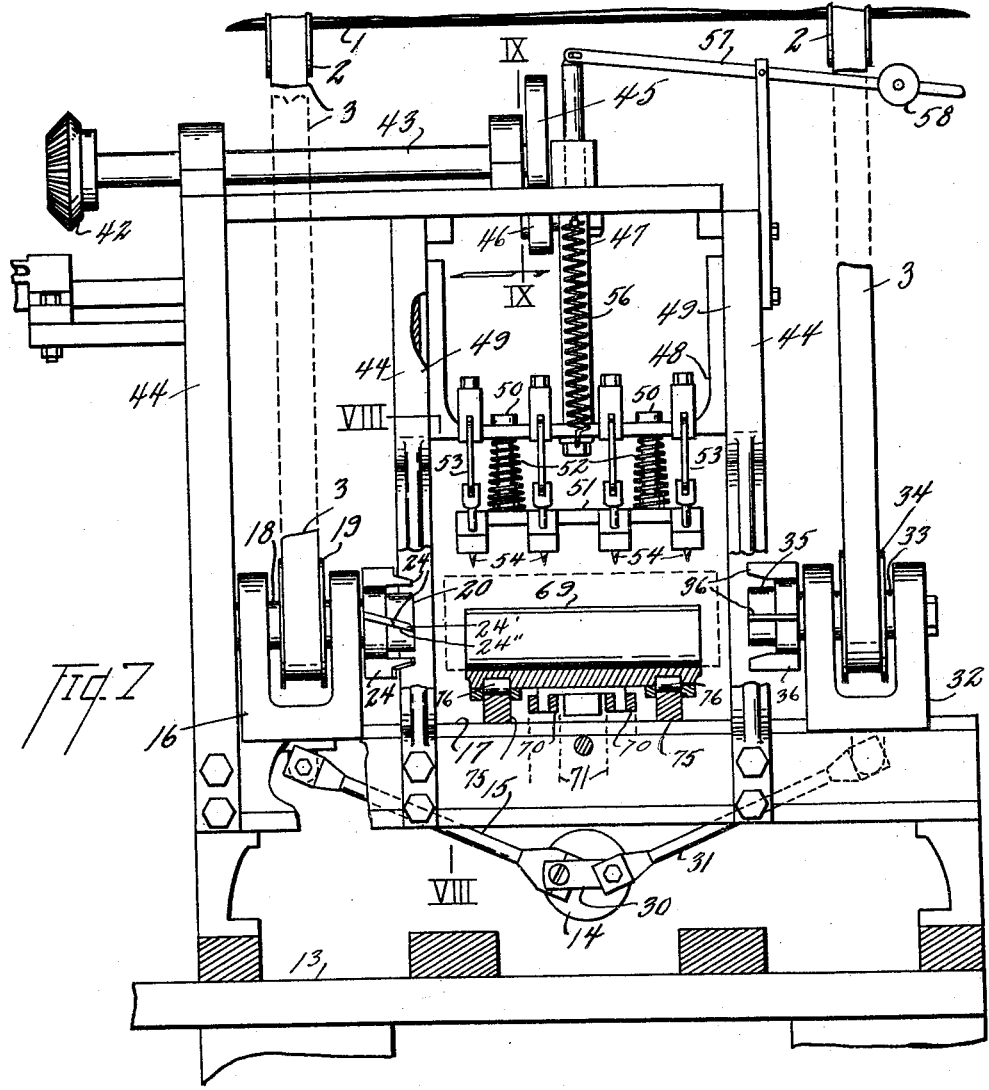
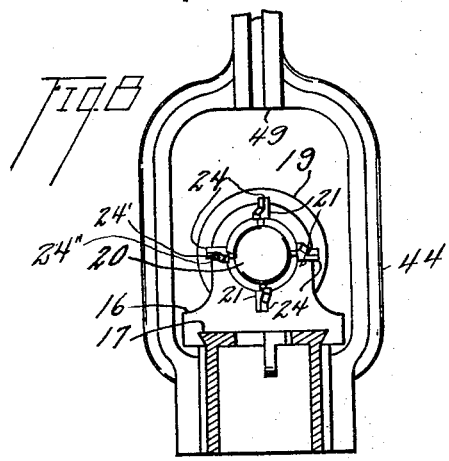
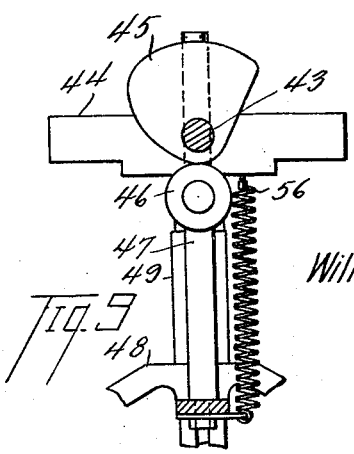
Inventor
William Salisbury
By
[signature]
Attorney Patented Mar. 14, 1933

1,901,195

UNITED STATES PATENT OFFICE

WILLIAM SALISBURY, OF TOLEDO, OHIO

TILE MANUFACTURE

Application filed January 14, 1931. Serial No. 508,592.

This invention relates to forming material, especially moldable material into ducts.

This invention has utility in the reforming of tile, in the production of fluid jet dispersing passageways for soil treatment.

Referring to the drawings:

Fig. 3 is a view on the line III—III, Fig. 1;

Fig. 4 is a side elevation of a blank or tile section to be reformed in the machine herein disclosed;

Fig. 5 is a view, with parts broken away, of a reformed duct section;

Fig. 6 is a section on the line VI—VI, Fig. 5;

Fig. 7 is a section on the line VII—VII, Fig. 1;

Fig. 8 is a view on the line VIII—VIII, Fig. 7; and

Fig. 9 is a view on the line IX—IX, Fig. 7.

Figure 1:
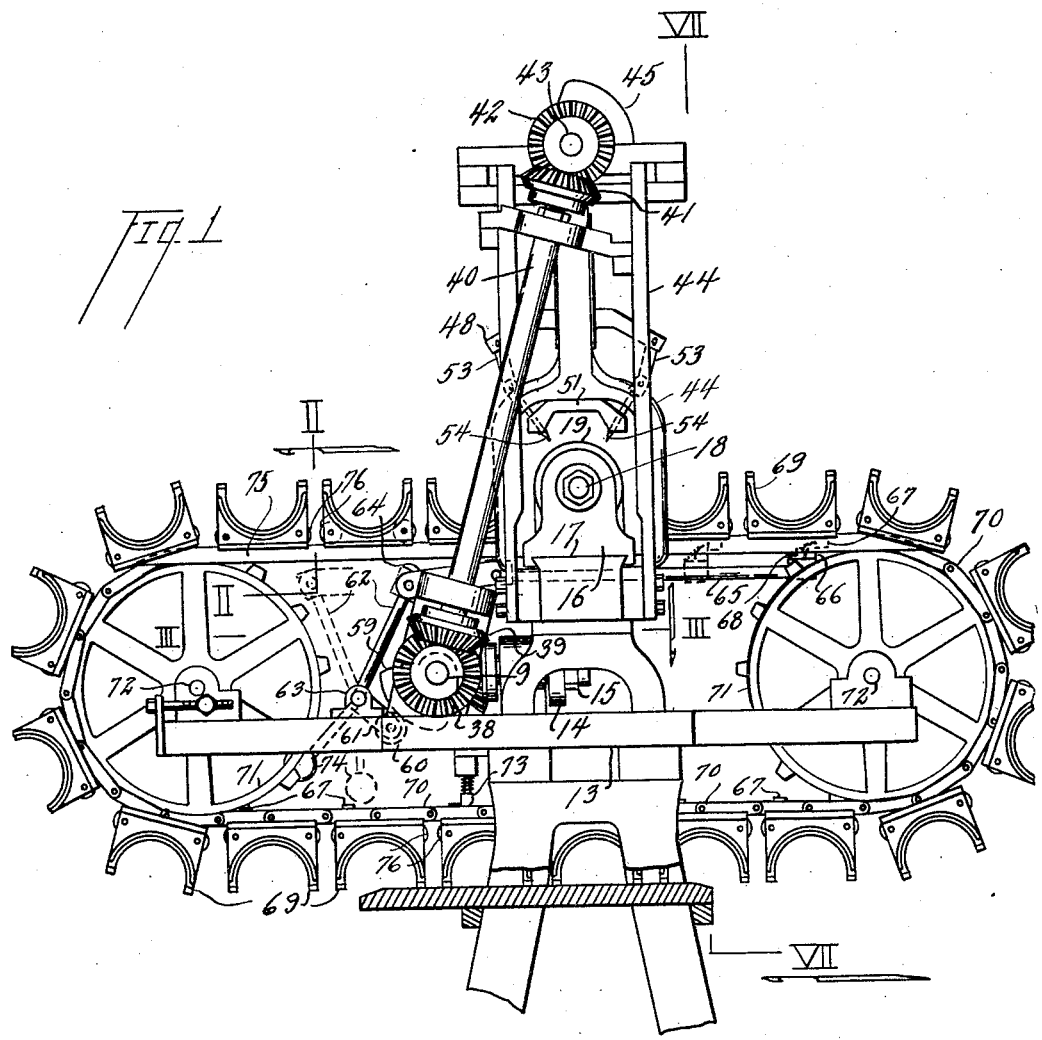
Fig. 1 is a side elevation, parts being broken away, of an embodiment of the invention in a reforming machine.
Figure 2:
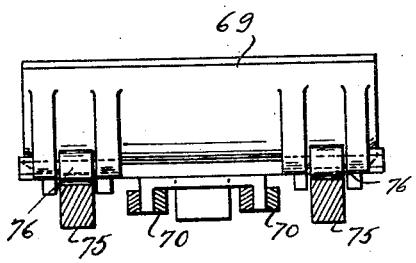
Fig. 2 is a section on the line II—II, Fig. 1.

Continuous driving power source as from a motor may have overhead line shaft 1 mounting pulleys 2 for operating belts 3. From the same or an additional motor, belt 4 is shown as extending to pulley 5 on shaft 6 having worm 7 in mesh with worm wheel 8 fixed on horizontal main drive shaft 9.

Fixed on this shaft 9 is bevel gear 10 in mesh with bevel gear 11 on shaft 12 mounted in general frame 13. This shaft 12 has crank 14 from which extends link 15 to head 16 reciprocable on bed or slide 17 of the frame. This slide 16 mounts shaft 18 upon which is pulley 19 rotated by one of the belts 3. The length of the bights of belt 3 is such that the belt is not whipped off the pulley 19 by the reciprocation of the slide 16. Fixed on the shaft 18 is a head 20 having an annular series of seats 21 shown as inclined approximately 15° to the axis of the shaft 18. Cutters 24 are mounted in these seats 21 for forming reentrant seat 22 in duct section 23. The cutting edges of this tool are formed by grinding the cutters to have a pair of faces 24', 24'', thereof intersect at approximately 45°.

Blank or duct section 23 hereunder is desirably produced from a suitable plastic as clay in a moist state and molded by extrusion from a pug-mill to have duct way 25 therethrough. For convenience in location, the external form of this duct 23 is desirably with arched top 26, flat bottom 27, and upwardly inclined sides 28 therefrom to a slight ledge 29.

The shaft 12 provides second crank 30 with link 31 extending oppositely from the link 15 as a connecting rod to head 32 mounting shaft 33 having pulley 34 driven by a belt 3. This shaft 33 has cutter head 35 carrying external cutters 36 for forming protruding seat 37 complementary to the reentrant seat 22 so that the duct sections 23 interfit in a series to form a passageway.

The shaft 9 extends past the bevel gear 10 and terminally carries bevel gear 38 (Figs. 1, 3) in mesh with bevel gear 39 on upwardly extending shaft 40 having bevel gear 41 fixed on the upper terminus thereof and in mesh with bevel gear 42 (Figs. 1, 7) fixed on shaft 43 mounted in upward frame extension 44 from the frame 13.

This shaft 43 has fixed thereon cam 45 (Fig. 9) coacting against roller 46 in extension 47 of crosshead 48 vertically reciprocable in guides 49 of the upstanding frame portion 44. This crosshead 48 loosely carries pins 50 extending to clamp member 51 normally thrust away from the crosshead 48 by springs 52. This clamp member 51 is configured to seat against the duct section sides 27, 28, and when thus located further rotation of the shaft 43 moves the crosshead 48 to compress the springs 52.

This means that links 53 thrust port forming pins 54 into the duct section 23 in thereby forming the lateral ports 55 in the duct section 23 transversely of the extent of the duct way 25 and extending thereinto. These port forming piercing pins thus supplement the holding action of the clamp 51 in anchoring the mounted duct section 23 which may be more or less green. The clay material is of substantial body to hold up for this operation, when this substance is conditioned to give it a waxy property.

The terminal seat forming operations occur simultaneously with the clamping as effected by the member 51 and the pins 54, resulting in a neat reforming or treating of the clay product so that it is in condition for subsequent drying and burning, or other finishing operation as may be desired. The rotation of the shaft 43 accordingly not only has the cam 45 bring the clamp member 51 into duct section holding position but a concentric longer radius portion holds this duct section while opposing slides 16, 32, have their cutter heads perform their respective operations to form the complementary seats 32, 37, in the section. Thereafter the abrupt termination of this cam 45 allows tension spring 56 to retract the crosshead 48 while the springs 52 retract the pins 54. In the lifting of the crosshead 48 lever 57 with counterweight 58 may supplement the action of the tension spring 56.

The shaft 9 between the bevel gears 10 and 38 is provided with cam 59 with which coacts roller 60 on the short arm 61 of lever having long arm 62. This lever 61, 62, is mounted in fulcrum 63 fixed with the frame 13. The cam 59 in rocking this lever 61, 62, has this rocking action transmitted through link 64 (Fig. 1) to pusher bar 65 having one-way rockable terminus 66 which is rigid as thrust forward in engagement with depending blocks 67, but due to spring 68 may rock clear of the succeeding block 67 in the retraction travel of this plunger 65. It is thus seen that in each rotation of the shaft 9 which means a cycle of operation for piercing and terminal seat forming in the duct section, there is a forward step of cradle or support 69 to bring the succeeding duct section 23 into position to be reformed. These cradles 69 are connected by links 70 in forming a sprocket chain carried by sprocket wheels 71 mounted on shafts 72 carried by the frame 13. As the push forward brings a succeeding duct section 23 into position under the clamping member 51, a block 67 slides past spring plunger 73 thereby holding the sprocket chain as an endless series of seats in this advanced position and against retraction. This maintains a desired registry for the clamp to find its position on the duct section and in thus finding its position to supplement the clamping action by the port forming pins 54 entering the section while thereafter there is the seat forming of the tile termini. The lever 61, 62, is provided with counterweight 74 for effecting its recovery in thus having the roller 60 follow the face of the cam 59.

Mounted on the frame 13 is a pair of tracks 75 under the upper flight of the carrier belt on which rollers mounted on the cradles 69 ride, holding the cradles against any longitudinal rocking during the forming operations.

It is accordingly seen that hereunder a continuous driving source effects continuous rotation of cutters 24, 36, on opposing reciprocating cutter heads which simultaneously act upon the opposing ends of the duct section 23 as intermittently fed into position and there held. This holding operation not only clamps the duct but pierces the duct to provide lateral ports 55 through which steam or other fluid may be dissipated in the use of this duct device as a submerged tile for soil sterilization or irrigation. The machine is accordingly one which has a capacity for accurately and definitely reforming molded earthen material in quantities.

The clamping not only securely holds the blank against movement but performs an operation thereon at the same time.

By a machine of the invention herein, a plastic object may be shaped by securely holding it against rotation and revolving the tool thereabout. This overcomes the revolving of the work and defeats deformation thereof by centrifugal force and positively retains the piece in the machine even in its semi-soft condition.

It is a material factor in the speeding up of turning plastics. The cutters in the machine herein may have a speed of 1200 R. P. M. while the pieces handled may run from 25 to 30 a minute according to the texture of the plastic handled.

What is claimed and it is desired to secure by United States Letters Patent is:

1. In the method of producing terminally complementary interfitting, laterally ported ducts from molded material, the steps comprising molding the duct, and with the material still workable but sufficiently rigid to hold its shape, clamping the duct section, transversely piercing said clamped section in providing lateral ports through the section from outside the molded material into the duct thereof, and terminally dressing a clamped section for forming complementary seats.

2. In the method of producing terminally complementary interfitting ducts from molded material, the steps comprising molding the ducts, and with the material still workable but sufficiently rigid to hold its shape, terminally dressing the section for simultaneous forming a seat on one end complementary to a seat on the other end for one to overhang the other throughout its entire extent.

3. A duct section handling machine comprising a cradle, operating means for positioning a clamp on a duct section in the cradle, and radial piercing means for the clamped section.

4. A duct section handling machine comprising an endless series of cradles, a clamp, operating means for positioning the clamp on a duct section in a cradle, and intermittent actuating means for bringing the cradles step by step into position at the clamp.

5. A duct section handling machine comprising a support, a clamp, operating means for positioning the clamp on a duct section in the support, and radial piercing means mounted with the clamp and effective upon clamp seating by further movement therefrom.

6. A duct section handling machine comprising a duct section support, terminal forming means for the supported duct section, and traveling means effecting relative rotation between the section and the forming means, said forming means including a cutter having its edge formed by receding planes from the relatively progressing cutting edge.

7. A duct section handling machine comprising complementary seat forming means for duct section termini, and traveling means effecting relative rotation between the section and the forming means, said forming means including a cutter having its general edge direction transverse the axis of the duct section approximately 15° while the cutter side therefrom is approximately 45°.

8. A shaping machine for plastic articles comprising a holder, means fastening the article against movement in the holder, a tool providing an active cutting edge eccentric to the article and at an angle to the axis of operation, and means operating said tool about the fixed article.

9. The method of turning plastic articles comprising revolving a cutter about the article while holding the article against rotation, and controlling the cutter to form a plane end for the article and a shoulder extending inwardly therefrom of a different dimension than the article exterior.

10. A plastic shaping machine comprising an intermittently moving carrier for the article, a reciprocating tool movable from clear of the article laterally toward the article to perform an operation upon an article on the carrier, and means for rotating the tool relatively to the article.

11. A duct section handling machine comprising a duct section support, a clamp for holding a duct section in said support, and a rotary cutter for a duct section terminus.

12. A duct section handling machine comprising a duct section support, a clamp for holding a duct section in the support, said clamp including means for effecting a reforming operation on said duct section, and a rotary cutter for a terminus of said duct section.

In witness whereof I affix my signature.
WILLIAM SALISBURY.